(12) United States Patent
Kurogane (10) Patent No.: US 8,687,209 B2
(45) Date of Patent: Apr. 1, 2014

(54) PROCESSING APPARATUS, PROCESSING SYSTEM, PROCESSING CONTROL METHOD, AND NON-TRANSITORY COMPUTER-READABLE MEDIUM

(75) Inventor: Toshio Kurogane, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 366 days.

(21) Appl. No.: 12/869,402

(22) Filed: Aug. 26, 2010

(65) Prior Publication Data

US 2011/0235076 A1 Sep. 29, 2011

(30) Foreign Application Priority Data

Mar. 26, 2010 (JP) ................................. 2010-071622

(51) Int. Cl.
*G06F 3/12* (2006.01)

(52) U.S. Cl.
USPC ............ 358/1.13; 358/1.14; 358/1.15; 399/80

(58) Field of Classification Search
USPC .............. 358/1.15, 1.13, 1.14, 1.16, 402, 403; 709/202, 203; 399/79, 80
See application file for complete search history.

(56) References Cited

U.S. PATENT DOCUMENTS

| | | | |
|---|---|---|---|
| 7,068,165 B2 * | 6/2006 | Takahashi et al. | ........ 340/539.26 |
| 8,319,989 B2 * | 11/2012 | Mizunashi et al. | ........... 358/1.15 |
| 2002/0046282 A1 | 4/2002 | Nishimura et al. | |
| 2005/0055547 A1 | 3/2005 | Kawamura | |
| 2007/0050050 A1 | 3/2007 | Tanida | |
| 2007/0076227 A1 * | 4/2007 | Lindquist et al. | ............... 358/1.1 |
| 2007/0258108 A1 * | 11/2007 | Matsumoto et al. | ......... 358/1.15 |
| 2008/0034411 A1 | 2/2008 | Aoyama | |
| 2009/0091776 A1 * | 4/2009 | Kobayashi et al. | .......... 358/1.13 |
| 2009/0207438 A1 * | 8/2009 | Fujita | ........................... 358/1.15 |
| 2009/0262388 A1 * | 10/2009 | Park | ............................ 358/1.15 |

FOREIGN PATENT DOCUMENTS

| | | |
|---|---|---|
| JP | 2001-325229 A | 11/2001 |
| JP | 2002-132723 A | 5/2002 |
| JP | 2005-85090 A | 3/2005 |
| JP | 2006-209504 A | 8/2006 |
| JP | 2006-285914 A | 10/2006 |
| JP | 2007-67875 A | 3/2007 |
| JP | 2008-40644 A | 2/2008 |
| JP | 2008-198125 A | 8/2008 |
| JP | 2008-217383 A | 9/2008 |
| JP | 2009-251863 A | 10/2009 |

OTHER PUBLICATIONS

Office Action, dated Jan. 21, 2014, issued by the Japanese Patent Office in counterpart Japanese Patent Application No. 2010-071622.

* cited by examiner

*Primary Examiner* — Vu B Hang
(74) *Attorney, Agent, or Firm* — Sughrue Mion, PLLC (57) ABSTRACT

A processing apparatus includes a processing unit and a first registration unit. The processing unit executes a requested process. The first registration unit registers therein first identification information which identifies another device, in advance. If a request for the process is received from said another device, the processing unit complies with the request without authenticating a user who makes the request on condition that the first identification information of said another device which makes the request is registered in the first registration unit.

15 Claims, 10 Drawing Sheets

| ADDRESS | GROUP ID |
|---|---|
| Address-A | Group-A |
| Address-B | Group-B |
| Address-C | Group-A |
| Address-D | Group-C |

| USER ID | GROUP ID | LANGUAGE | INDIVIDUAL SETTING "A" | INDIVIDUAL SETTING "B" |
|---|---|---|---|---|
| XXX | Group-A | Japanese | XXX | yyy |
| XXX | Group-B | English | YYY | zzz |
| YYY | Group-A | Japanese | ZZZ | xxx |
| ⋮ | | | | |

PROCESSING APPARATUS, PROCESSING SYSTEM, PROCESSING CONTROL METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2010-71622 filed Mar. 26, 2010.

BACKGROUND

Technical Field

The invention relates to a processing apparatus, a processing system, a processing control method, and a non-transitory computer-readable medium storing a program that causes a computer to execute the processing control method.

SUMMARY

A processing apparatus includes a processing unit and a first registration unit. The processing unit executes a requested process. The first registration unit registers therein first identification information which identifies another device, in advance. If a request for the process is received from said another device, the processing unit complies with the request without authenticating a user who makes the request on condition that the first identification information of said another device which makes the request is registered in the first registration unit.

BRIEF DESCRIPTION OF THE DRAWINGS

Exemplary embodiments of the invention will be described in detail below based on the accompanying drawings, wherein.

DETAILED DESCRIPTION

Now, exemplary embodiments of the invention will be described.

Figure 1:
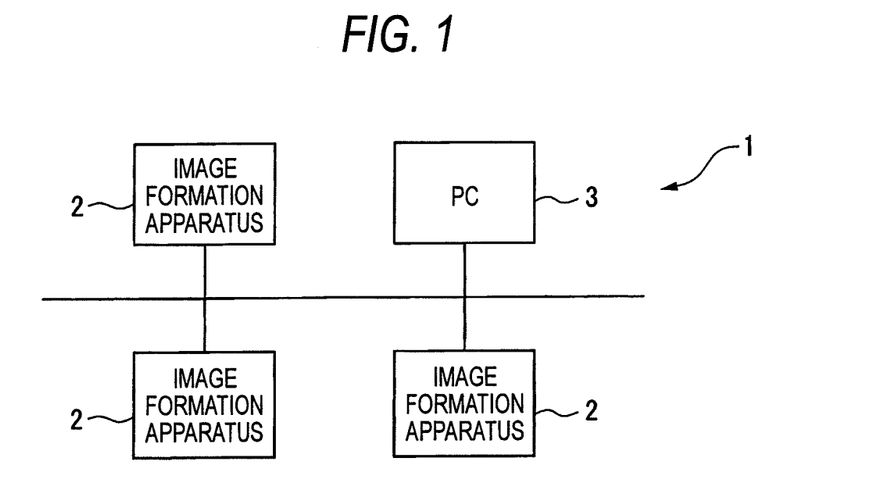
FIG. 1 is an explanatory view showing the whole configuration of a processing system according an exemplary embodiment of the invention.

FIG. 1 is an explanatory view showing the whole configuration in a processing system 1 according to one exemplary embodiment. The processing system 1 is configured so that one or more image formation apparatuses 2 which serve as first processing apparatuses or other devices, and a personal computer (PC) 3 which serves as a processing apparatus or a second processing apparatus are interconnected through a local area network (LAN) 4.

Figure 2:
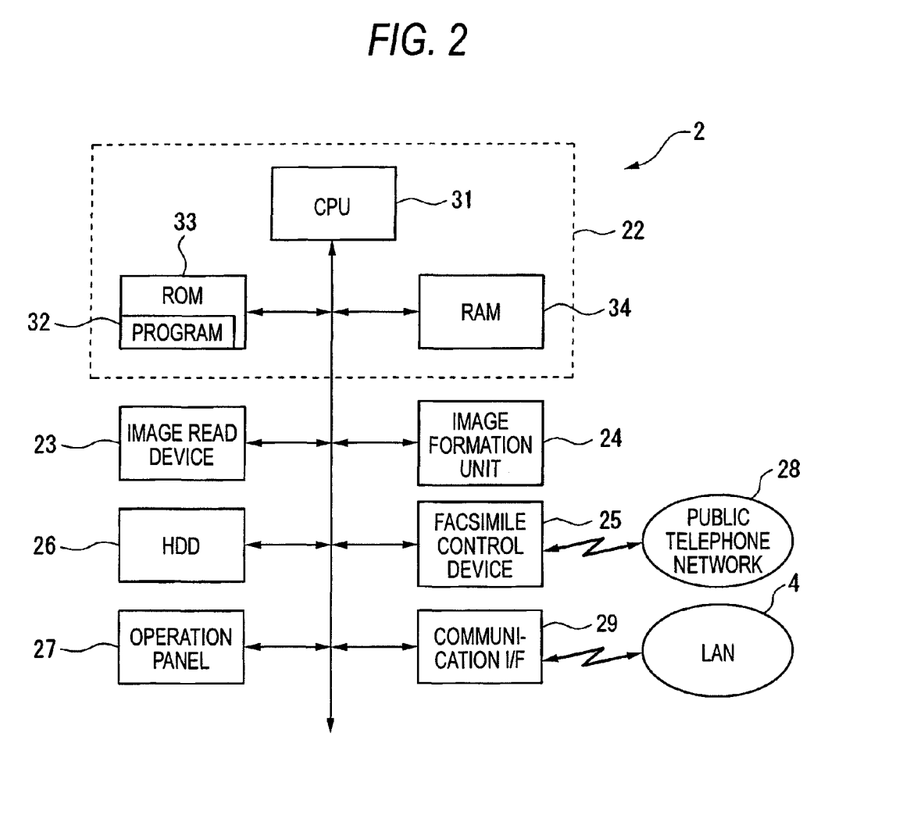
FIG. 2 is a block diagram showing electrical connections in an image formation apparatus of the processing system according to the exemplary embodiment of the invention.

FIG. 2 is a block diagram showing electrical connections in the image formation apparatus 2. This image formation apparatus 2 includes a main control section 22 which controls the whole apparatus, an image read device 23 which reads an image of an original, an image formation unit 24 which performs image formation based on the image data, such as the image of the original read by the image read device 23, a facsimile control device 25 which transmits and receives facsimile data to and from a public telephone network 28, a magnetic storage device (HDD) 26 which stores various data such as the image data, an operation panel 27 which accepts various operations from a user and which displays various messages thereon, and a communication interface (I/F) 29 which communicates with the LAN 4.

The main control section 22 includes a CPU 31 which controls respective portions, a ROM 33 which stores a control program 32 to be executed by the CPU 31 and various fixed data, and a RAM 34 which serves as a working area of the CPU 31.

The control program 32 has been set up from the beginning of the fabrication of the image formation apparatus 2. However, the control program 32 may well be set up later by downloading it through a communication tool such as the Internet or later by reading it from a storage medium which stores the control program 32.

Figure 3:
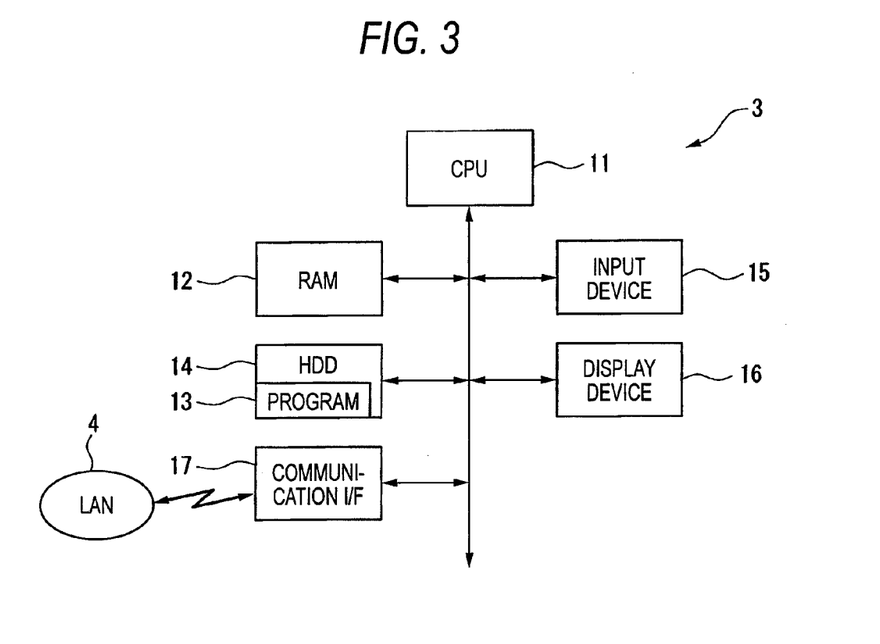
FIG. 3 is a block diagram showing electrical connections in a personal computer according to the exemplary embodiment of the invention.

FIG. 3 is a block diagram showing electrical connections in the PC 3. The PC 3 is configured so that a CPU 11 and a RAM 12 are interconnected. The CPU 11 executes various operations and controls respective portions. The RAM 12 serves as a working area of the CPU 11. A magnetic storage device (HDD) 14, an input device 15 such a keyboard and/or a mouse, a display device and a communication interface (I/F) 17 are connected to the CPU 11. The HDD 14 stores various data such as a control program 13. The display device 16 displays various images thereon. The communication interface (I/F) 17 communicates with the LAN 4.

In the processing system 1 having the hardware architecture as stated above, the image formation apparatus 2 can execute various processes such as printing, copying, scanning, and facsimile transmission/reception in accordance user's requests based on the control program 32. The PC 3 executes a process requested from the image formation apparatus 2, for example, a process for saving image data scanned in the image formation apparatus 2, based on the control program 32.

Figure 4:
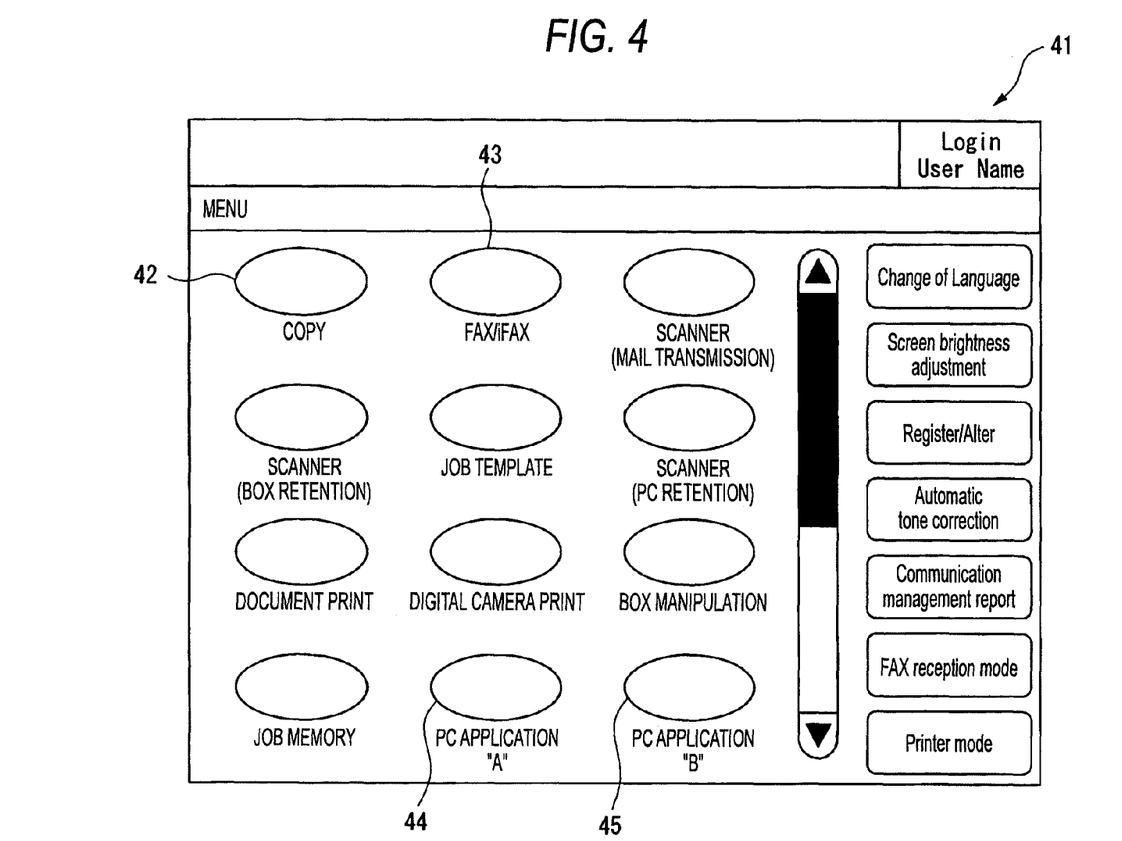
FIG. 4 is a plan view of an operation screen which is displayed on an operation panel of the image formation apparatus of the processing system according to the exemplary embodiment of the invention.

FIG. 4 is a plan view showing an example of an operation screen which is displayed on a touch panel of the operation panel 27 of the image formation apparatus 2. The operation screen 41 includes (i) operation buttons which are displayed based on the control program 32 and which give commands to execute various processes executable by the image formation apparatus 2, and (ii) operation buttons which give commands to execute various processes executable by the PC 3. By way of example, a copy button 42 for operating a copying function of the image formation apparatus 2, and a facsimile button 43 for operating a facsimile function are buttons for invoking the copying function and facsimile function. A PC application "A" button 44 and a PC application "B" button 45 are buttons for invoking application software "A" and "B" in the PC 3, respectively. In this manner, both the image formation apparatus 2 and the PC 3 can be operated with the common operation panel 27. Therefore, the user can be let feel as if both the functions of the image formation apparatus 2 and those of the PC 3 were realized by one apparatus, without being aware that the image formation apparatus 2 and the PC 3 are separate apparatuses. When the PC 3 is requested to execute a certain function, by operating the operation panel 27, a request for execution of the function is transmitted from the image formation apparatus 2 to the PC 3, and the PC 3 executes a pertinent function.

Regarding many of functions executable by such a processing system 1, it is a condition for execution of any of the functions to authenticate a user when the user wants to use any of the functions. Also, since the image formation apparatus 2 and the PC 3 are the separate apparatuses, essentially the authentication of the user is required every apparatus. More specifically, when the user intends to utilize a function of the PC 3 anew in the case where he/she has already been authenticated by the image formation apparatus 2, but where he/she has not been authenticated by the PC 3 yet, he/she needs to receive authentication of the PC 3 at that point of time.

However, it is very troublesome to require authentication again for the user who has already been authenticated by the image formation apparatus 2, and who recognizes as if the various functions offered by the PC 3 were also the functions of the image formation apparatus 2. It is also said that, since the user has already been authenticated by the image formation apparatus 2, requesting for the authentication again in the PC 3 is unnecessary.

There will now be described in detail the point that, in the case where the user has already been authenticated by the image formation apparatus 2, he/she is permitted to use a certain function of the PC 3 without requiring the authentication of him/her anew in the PC 3.

Figure 5:
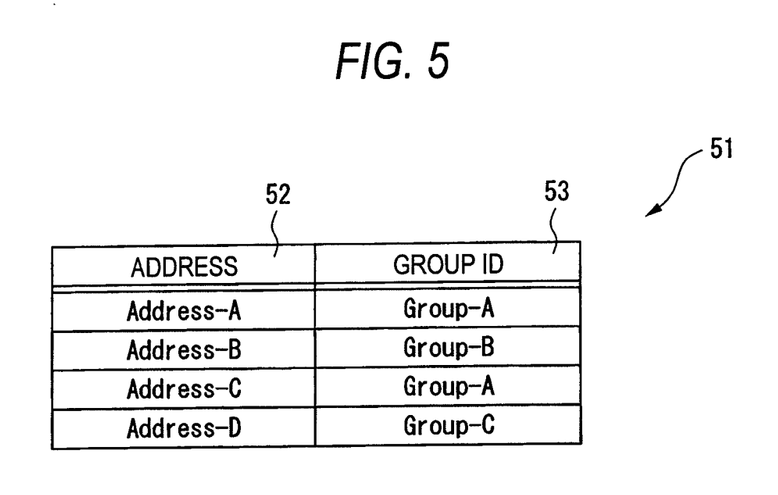
FIG. 5 is an explanatory diagram of a device information registration table in the personal computer according to the exemplary embodiment of the invention.

FIG. 5 is an explanatory diagram of a device information registration table. The device information registration table 51 is stored in the HDD 26 of the image formation apparatus 2 or the like. Addresses 52 which identify the image formation apparatuses 2 and which serve as first identification information may be registered in the device information registration table 51. Examples of the address 52 include an IP address, a MAC address and the like. Also, group IDs 53 may be registered in association with the respective addresses 52 registered therein. Each group ID 53 is an ID number for identifying a group to which the pertinent image formation apparatus 2 belongs.

Figure 6:
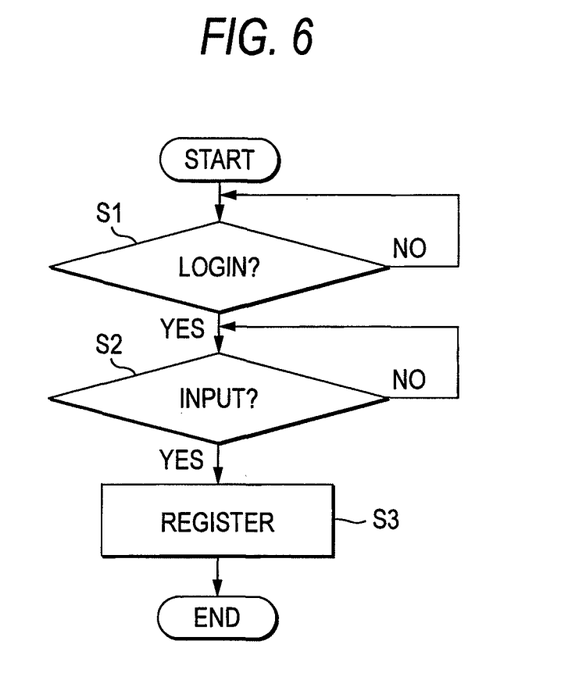
FIG. 6 is a flow chart of a process for registering information, such as an address, in the device information registration table in the personal computer according to the exemplary embodiment of the invention.

FIG. 6 is a flow chart of a process for registering information, such as the address 52, into the device information registration table 51. First, an administrator of the processing system 1 operates the operation panel 27, to thereby log into the PC 3 as the administrator ("Yes" at step S1). Also, when the administrator inputs the address 52 or group ID 53 regarding the image formation apparatus 2 which is to be registered anew ("Yes" at step S2), the input content is registered into the device information registration table 51 (step S3).

The operation buttons of the PC 3 are displayed on the operation screen 41 of the operation panel 27 of the image formation apparatus 2 by having the PC 3 request each of the image formation apparatuses 2 whose addresses 52 are registered in the device information registration table 51, to display the operation buttons of the PC 3.

Figure 7:
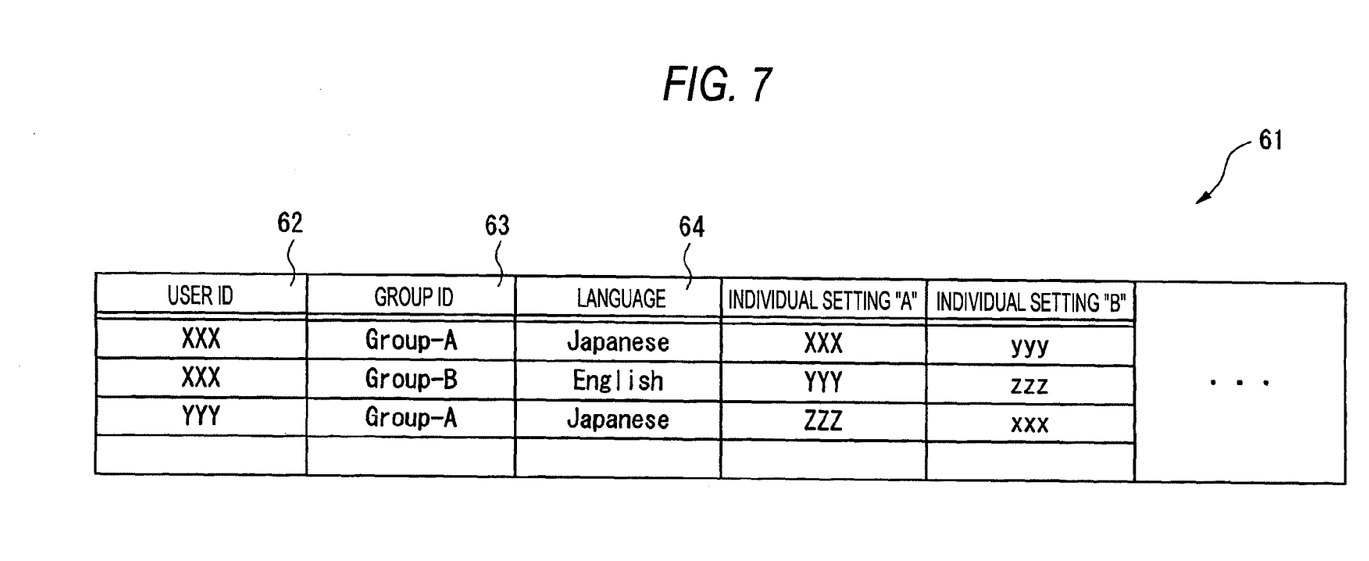
FIG. 7 is an explanatory diagram of an individual setting information table in the personal computer according to the exemplary embodiment of the invention.

FIG. 7 is an explanatory diagram of an individual setting information table. The individual setting information table 61 is a table which is prepared in each of the image formation apparatuses 2 and PC 3. In the individual setting information table 61, individual settings which are applied when the users use the image formation apparatuses 2 and the PC 3, respectively, are registered. That is, in the image formation apparatus 2 or the PC 3, the settings which are applied when the image formation apparatus 2 or the PC 3 is used can be registered for each user. Examples of the settings include a language (e. g., Japanese or English) which is displayed on the operation panel 27 when the image formation apparatus 2 or the PC 3 is operated through the operation panel 27, adjustment of the brightness of the display screen of the operation panel 27, adjustment of a character size, initial values of respective parameters of the application software, and so forth. The settings registered in this manner are referred when the user uses the image formation apparatus 2 or the PC 3, and the image formation apparatus 2 or the PC 3 operates in accordance with the settings.

More specifically, in the individual setting information table 61, a user ID 62 of each user, a group ID 63 for indicating a group to which the user of the corresponding user ID 62 belongs, a language 64 which the corresponding user wants to use, and various individual settings A, B, for the corresponding user, such as the brightness and the character size stated above, are registered in association with one another.

Figure 8:
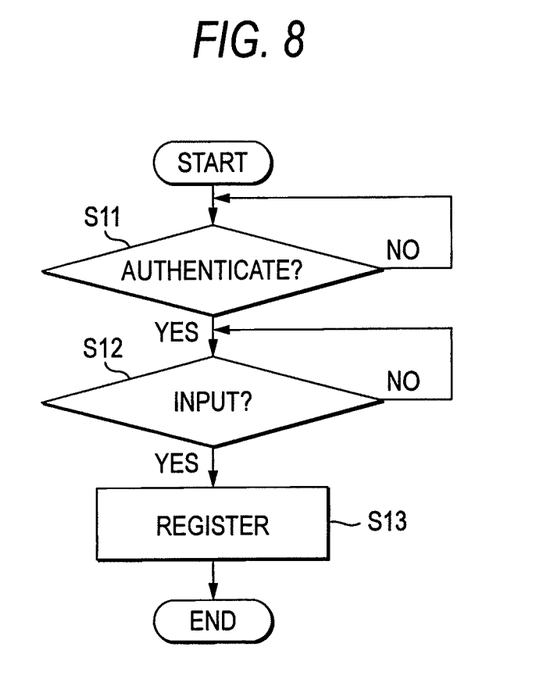
FIG. 8 is a flow chart of a process for registering information in the individual setting information table in the personal computer according to the exemplary embodiment of the invention.

FIG. 8 is a flow chart of a process for registering information into the individual setting information table 61. First, the user operates the operation panel 27, to thereby receive an authentication by an apparatus, among the image formation apparatus 2 and the PC 3, of which he/she wants to register the information into the individual setting information table 61 (step S11). Here, it is assumed that an authentication table in which the user ID 62 and a password of each user are registered in association is prepared in each of the image formation apparatus 2 and the PC 3. The user who has input a correct user ID 62 and a password is authenticated. When the user is authenticated ("Yes" at step S11), and the information to be registered into the individual setting information table 61 has been input ("Yes" at step S12), the input content is registered into the individual setting information table 61 (step S13).

Such an individual setting information table 61 is held in each of the image formation apparatus 2 and the PC 3. Therefore, in the case where the version of application software has been upgraded in the PC 3, the individual setting information of the individual setting information table 61 of the PC 3 may be updated, and it may not be necessary to upgrade the version of the image formation apparatus 2.

Figure 9:
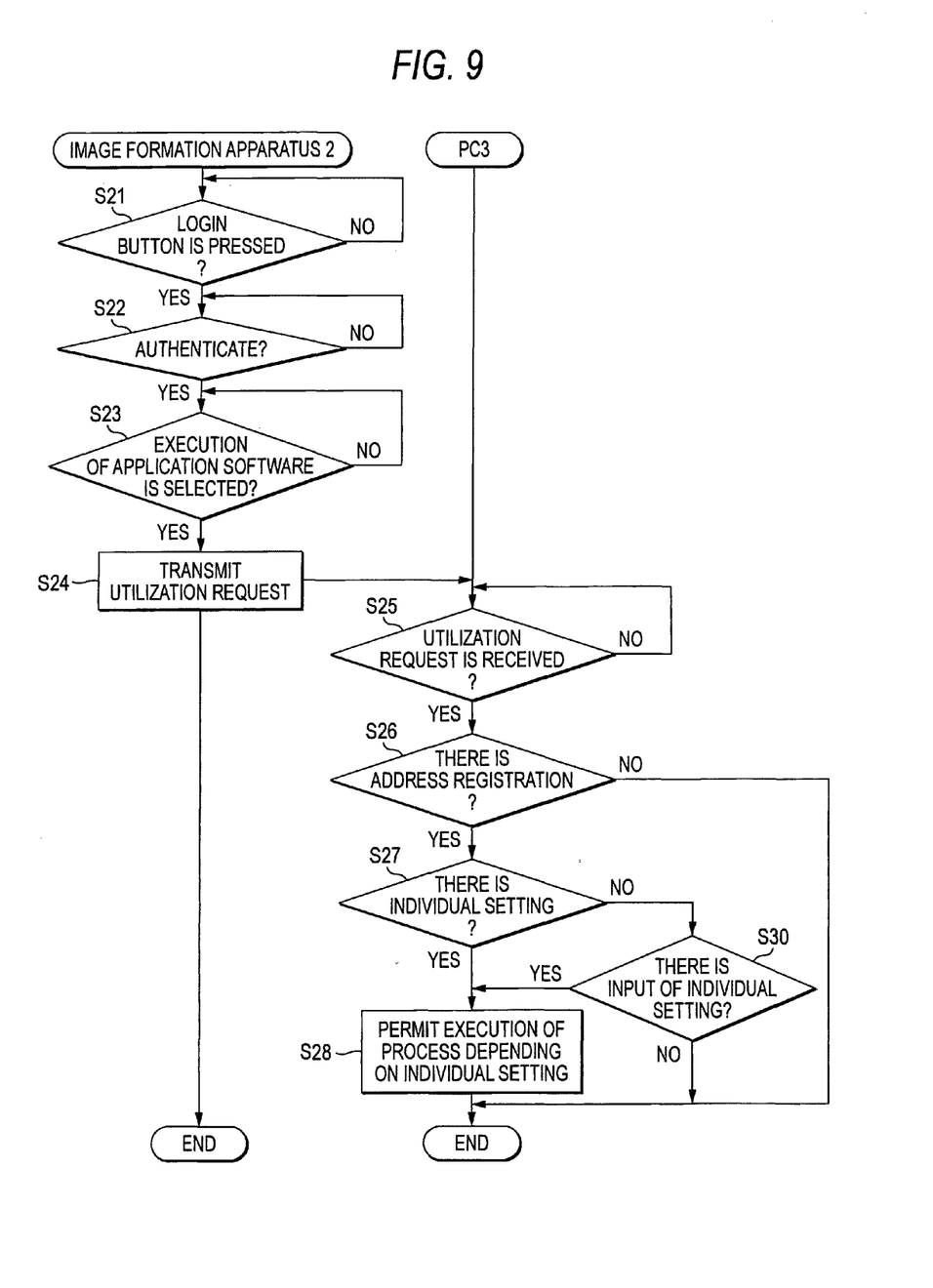
FIG. 9 is a diagram of a communication sequence between the image formation apparatus 2 and the PC 3 in the case where the PC 3 is utilized by operating the operation panel in the processing system according to the exemplary embodiment of the invention.

FIG. 9 is a diagram of a communication sequence between the image formation apparatus 2 and the PC 3 in the case where the PC 3 is utilized by operating the operation panel 27. First, when a login button is pressed on the operation panel 27 ("Yes" at step S21), a login screen is displayed. Here, the user inputs the correct user ID and password of his/her own, whereby the user is authenticated ("Yes" at step S22). When the user operates the operation panel 27, to thereby select to run the application software executable by the PC 3 ("Yes" at step S23), a request for utilizing the application software is transmitted to the PC 3 (step S24).

In the PC 3, when the utilization request is received ("Yes" at step S25), it is determined as to whether or not the address 52 of the image formation apparatus 2 having made the utilization request is registered in the device information registration table 51 (step S26). If the address 52 of the image formation apparatus 2 having made the pertinent utilization request is registered in the device information registration table 51 ("Yes" at step S26), the process of the utilization request is permitted. More specifically, the utilization request contains the user ID 62 of the user who has made the request (step S24), and it is determined as to whether or not the individual setting of the user is registered in the individual setting information table 61 of the PC 3 using the user ID 62 (step S27). If the individual setting is registered ("Yes" at step S27), it is permitted to execute the process requested by the PC 3 with the individual setting registered in association with the user in the individual setting information table 61 (step S28).

If the individual setting is not registered ("No" at step S27), the series of processing steps are ended. In this case, if the individual setting is not registered ("No" at step S27), processing may be executed as follows: A request for the authentication of the user is made from the PC 3 anew, not from the image formation apparatus 2, and the process of the utilization request is permitted (the step S27, et seq.) on condition that the authentication has been made.

If the individual setting of the user is not registered in the individual setting information table 61 ("No" of the step S27), the individual setting may be input anew from the user ("Yes" at step S30), and it is permitted to execute a process requested by the PC 3 in accordance with the input individual setting (step S28).

In the above case, if the address 52 of the image formation apparatus 2 having made the utilization request is not registered in the device information registration table 51 ("No" at step S26), a notification indicating that the utilization request is rejected may be transmitted to the pertinent image formation apparatus 2.

Also, if the individual setting of the user is not registered ("No" at step S27), processing may be executed so that individual setting information for the user is generated anew, and that it is permitted to execute the process requested by the PC 3 in accordance with the new setting (step S28). Regarding the individual setting information, the PC 3 may request the image formation apparatus 2 to send the information of the individual setting of the user which is registered in the individual setting information table 61, so as to register the sent information into the individual setting information table 61 of the PC 3. Alternatively, an initial value which is determined in the PC 3 in advance may be registered into the individual setting information table 61 of the PC 3.

Furthermore, even if the individual setting of the user is registered in the individual setting information table 61 of the PC 3 ("Yes" at step S27), processing may be executed as follows: In the case where the PC 3 requests the image formation apparatus 2 to send the information of the registered individual setting of the user which is registered in the individual setting information table 61, and where registered contents have any difference between the individual setting information table 61 of the PC 3 and that 61 of the image formation apparatus 2, the registered contents of the individual setting information table 61 of the image formation apparatus 2 are reflected into the registered contents of the individual setting information table 61 of the PC 3 to-be-used, and it is permitted to execute the process requested by the PC 3 in accordance with the individual setting after the reflection (step S28).

Incidentally, if the contents of the individual setting of the individual setting information table 61 of the pertinent PC 3 have been altered after the individual setting of the individual setting information table 61 of the image formation apparatus 2 is reflected into the individual setting information table 61 of the PC 3, the fact of the alteration may be notified to the image formation apparatus 2 so as to rewrite the contents of the individual setting information table 61 of the image formation apparatus 2 in conformity with the contents of the individual setting information table 61 of the PC 3.

The process in FIG. 9 illustrates an example in the case where the user operates the login button (step S21), whereby he/she prompts the processing system 1 to authenticate himself/herself (step S22). However, the processing system 1 may prompt the user so that the processing system 1 performs authentication. By way of example, in the case where the user selects to execute a function which is executable on condition that the user is authenticated by the image formation apparatus 2, the image formation apparatus 2 displays a login screen and prompts the user to have authentication.

Also, in the process in FIG. 9, if the user is authenticated by the image formation apparatus 2 (step S22), the function of the PC 3 is made utilizable on condition that the existence of the registration of the address 52 of the image formation apparatus 2 is confirmed by the PC 3 (step S26). However, in the case where the user is not authenticated even by the image formation apparatus 2, the user may be treated as having been authenticated as an anonymous user by the PC 3, so as to execute the processing of the step S26 et seq. when the utilization request is received from the image formation apparatus 2 ("Yes" at step S25).

Figure 10:
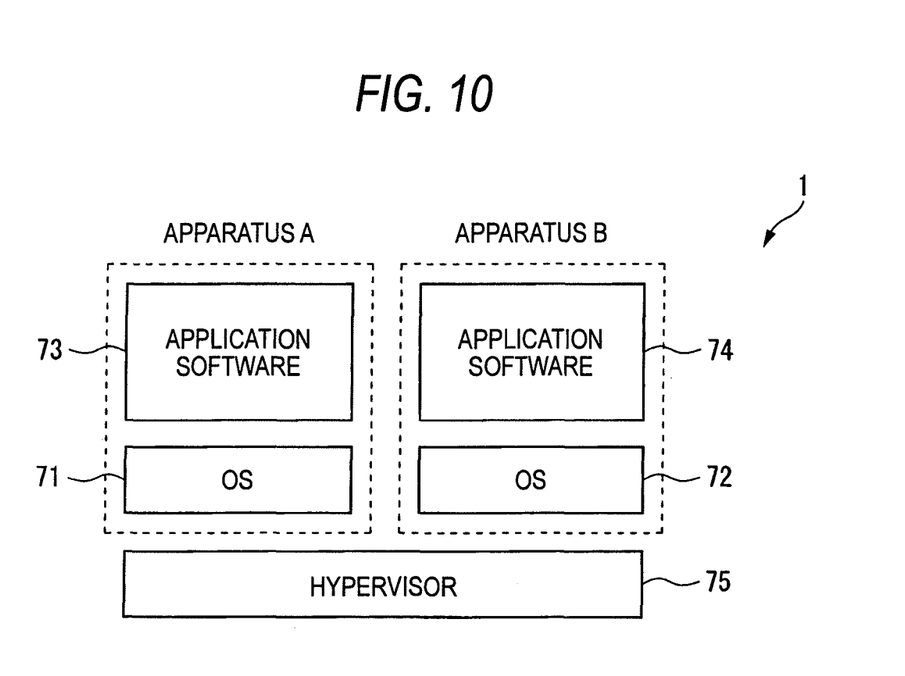
FIG. 10 is an explanatory view for explaining a processing system according to another exemplary embodiment of the invention.

FIG. 10 is an explanatory view showing another architectural example of the processing system 1. The hardware configuration of the processing system 1 is substantially the same as that of the image formation apparatus 2 shown in FIG. 2. FIG. 10 explains the configuration of the control program 32 shown in FIG. 2. More specifically, the processing system 1 is configured of one PC 3, in which two different operating systems (OSes) 71 and 72 are respectively running. Also, application software 73 is running on the OS 71, while application software 74 is running on the OS 72. The OSes 71 and 72 run on a hypervisor 75.

If operations of the OS 71 and the application software 73 are grasped as an apparatus A and if operations of the OS 72 and the application software 74 are grasped as an apparatus B, the processing system 1 configured of the apparatuses A and B performs operations similar to those of the processing system 1 described with reference to FIGS. 1 to 9. In this case, the apparatus A becomes a first processing apparatus and corresponds to the image formation apparatus 2 stated before. Also, the apparatus B becomes a second processing apparatus and corresponds to the PC 3 stated before.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus comprising:
a processing unit that executes a requested process; and
a first registration unit that registers therein device identification information which identifies another device, in advance, wherein
if a request for the process is received from said another device, the processing unit complies with the request without authenticating a user who makes the request on condition that the device identification information of said another device is registered in the first registration unit and the user is authenticated by said another device in advance;
a second registration unit that registers therein a stored user setting which is used when the user executes the process with the processing unit, in association with user identification information for identifying the user, wherein
if the user identification information of the user who makes the request is registered in the second registration unit in a case where the request for the process is received from said another device and where the device identification information is registered in the first registration unit, the processing unit executes the process based on the stored user setting which is registered in the second registration unit in association with the user identification information,
wherein said another device is an image forming apparatus.

2. The processing apparatus according to claim 1, wherein if the user identification information of the user who makes the request is registered in the second registration unit in the case where the request for the process is received from said another device and where the device identification information is registered in the first registration unit, the second registration unit reflects into the stored user setting, information which is acquired from said another device which makes the request and which relates to the user indicated by the user identification information.

3. The processing apparatus according to claim 2, further comprising:
a notification unit, wherein
if the stored user setting into which the information acquired from said anther device which makes the request is reflected by the second registration unit is altered, the notification unit notifies the alteration of the stored user setting to said another device which makes the request for the process, when the requested process is ended by the processing unit.

4. The processing apparatus according to claim 1, wherein the first registration unit can register therein plural pieces of device identification information which identify plural other devices, respectively.

5. The processing apparatus according to claim 1, wherein the first registration unit can register therein plural pieces of device identification information which identify plural other devices, respectively.

6. The processing apparatus according to claim 2, wherein the first registration unit can register therein plural pieces of device identification information which identify plural other devices, respectively.

7. The processing apparatus according to claim 3, wherein the first registration unit can register therein plural pieces of device identification information which identify plural other devices, respectively.

8. A processing system comprising:
a first processing apparatus that executes a requested process; and
a second processing apparatus that is connected to the first processing apparatus through a communication tool, wherein
the second processing apparatus includes
a processing unit that executes a requested process,
a first registration unit that registers therein device identification information which identifies another device, in advance; and
a second registration unit that registers therein a stored user setting which is used when the user executes the process with the processing unit, in association with user identification information for identifying the user;
if a request for the process is received from said another device, the processing unit complies with the request without authenticating a user who makes the request, on condition that the device identification information of said another device is registered in the first registration unit and the user is authenticated by said another device in advance; and
if the user identification information of the user who makes the request is registered in the second registration unit in a case where the request for the process is received from said another device and where the device identification information is registered in the first registration unit, the processing unit executes the process based on the stored user setting which is registered in the second registration unit in association with the user identification information,
wherein said another device is an image forming apparatus.

9. A non-transitory computer-readable medium that stores a program causing a computer to execute a processing control method, the method comprising:
if a request for a process is received from another device, executing the process in accordance with the respect without authenticating a user on condition that device identification information which identifies said another device is registered in a registration unit in advance, after the user is authenticated by said another device,
registering a stored user setting which is used when the user executes the process, in association with user identification information for identifying the user, and
if the user identification information of the user who makes the request is registered in a case where the request for the process is received from said another device and where the device identification information is registered in the first registration unit, executing the process based on the stored user setting which is registered in association with the user identification information,
wherein said another device is an image forming apparatus.

10. The processing apparatus according to claim 1, wherein the device identification information is address information of the another device.

11. The processing apparatus according to claim 1, wherein the stored user setting is a language.

12. The processing apparatus according to claim 1, wherein the stored user setting is a brightness of a display icon.

13. The processing apparatus according to claim 1, wherein the stored user setting is a character size.

14. The processing apparatus according to claim 1, wherein the stored user setting is parameters of application software.

15. The processing apparatus according to claim 1, wherein the stored user setting is stored before the request for the process.

* * * * *